(12) United States Patent
Gibson et al.

(10) Patent No.: US 9,599,057 B2
(45) Date of Patent: Mar. 21, 2017

(54) METHOD AND SYSTEM FOR SELECTING A CYLINDER FOR ENGINE STARTING

(71) Applicant: Ford Global Technologies, LLC, Dearborn, MI (US)

(72) Inventors: Alexander O'Connor Gibson, Ann Arbor, MI (US); Steven Wooldridge, Saline, MI (US); Joseph Lyle Thomas, Kimball, MI (US); David Oshinsky, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 460 days.

(21) Appl. No.: 14/173,404

(22) Filed: Feb. 5, 2014

(65) Prior Publication Data

US 2015/0219036 A1     Aug. 6, 2015

(51) Int. Cl.
| | | |
|---|---|---|
| *B60T 7/12* | (2006.01) | |
| *F02D 41/30* | (2006.01) | |
| *F02D 41/06* | (2006.01) | |
| *F02D 41/40* | (2006.01) | |
| *F02M 69/04* | (2006.01) | |
| *F02D 13/02* | (2006.01) | |
| *F02D 29/02* | (2006.01) | |
| *F02N 11/08* | (2006.01) | |
| *F02D 41/00* | (2006.01) | |
| *F02D 41/38* | (2006.01) | |
| *F02B 75/12* | (2006.01) | |

(52) U.S. Cl.
CPC ..... *F02D 41/3076* (2013.01); *F02D 13/0219* (2013.01); *F02D 13/0265* (2013.01); *F02D 29/02* (2013.01); *F02D 41/065* (2013.01); *F02D 41/3094* (2013.01); *F02D 41/402* (2013.01); *F02M 69/042* (2013.01); *F02B 2075/125* (2013.01); *F02D 2041/001* (2013.01); *F02D 2041/0092* (2013.01); *F02D 2041/389* (2013.01); *F02N 11/0814* (2013.01); *Y02T 10/123* (2013.01); *Y02T 10/18* (2013.01); *Y02T 10/44* (2013.01)

(58) Field of Classification Search
CPC .......................... F02D 41/1454; F02D 19/081
USPC ......... 701/103–105; 123/434, 679, 445, 478, 123/480
See application file for complete search history.

(56) References Cited

U.S. PATENT DOCUMENTS

| | | | |
|---|---|---|---|
| 2003/0200952 A1 | 10/2003 | Ito et al. | |
| 2008/0196696 A1 | 8/2008 | Storhok et al. | |
| 2013/0152903 A1* | 6/2013 | Leone | F02D 41/062 123/491 |
| 2013/0253803 A1 | 9/2013 | Krengel et al. | |
| 2013/0296124 A1* | 11/2013 | Pietron | B60W 20/40 477/5 |
| 2013/0296126 A1* | 11/2013 | Gibson | F02N 11/006 477/5 |

(Continued)

*Primary Examiner* — John Kwon
(74) *Attorney, Agent, or Firm* — Julia Voutyras; John D. Russell; B. Anna McCoy

(57) ABSTRACT

A method and system for improving starting of an engine is presented. In one example, the method selects a first cylinder to receive fuel since engine stop the cylinder's position relative to the cylinder's top-dead-center compression stroke. The method also describes adjusting a number of fuel injections for a first combustion event since engine stop.

6 Claims, 7 Drawing Sheets

(56) References Cited

U.S. PATENT DOCUMENTS

2013/0297122 A1* 11/2013 Gibson ................. B60W 20/40
                                                        701/22
2013/0297123 A1* 11/2013 Gibson ............. B60W 20/1084
                                                        701/22

* cited by examiner

METHOD AND SYSTEM FOR SELECTING A CYLINDER FOR ENGINE STARTING

FIELD

The present description relates to methods and systems for improving starting of an engine. The method and system may be particularly useful for engines that are frequently stopped and restarted.

BACKGROUND AND SUMMARY

It may be desirable to stop an engine at a same location each time the engine is stopped. An engine may be stopped before each engine start at nearly the same position if the engine may be rotated via a motor or other device. Alternatively, engine components including but not limited to engine valves, throttle, and spark timing may be adjusted during an engine stop to improve the possibility of the engine stopping at a same desired location. However, it may be difficult or cost prohibitive to adjust engine actuators or an electric machine such that engine stopping position is a same position for each engine stop. Consequently, engine emissions and/or engine run-up time (e.g., time from engine cranking until the engine reaches a desired speed, such as idle speed) may degrade or change depending on the engine stopping location.

The inventors herein have recognized the above-mentioned disadvantages and have developed a method for starting an engine, comprising: selecting a cylinder and providing two fuel injections during a compression stroke of the cylinder for a first combustion event since engine stop in response to a piston of the cylinder being within a third threshold number of crankshaft degrees before the cylinder's TDC compression stroke; and adjusting a ratio of fuel between the two fuel injections in response to intake valve closing timing.

By selecting a cylinder of an engine for a first fuel injection event since engine stop in response to the cylinder's position relative to the cylinder's top-dead-center compression stroke position, it may be possible to provide the technical result of reduced engine emissions and a short engine starting time. Further, a ratio of fuel between first and second fuel injections to the selected cylinder may be adjusted to improve combustion stability and engine starting robustness.

The present description may provide several advantages. In particular, the approach may improve engine starting consistency by reducing the possibility of engine misfire. Further, the approach may improve engine starting emissions by improving mixture ignitability. Further still, the approach may improve a driver's perception of engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
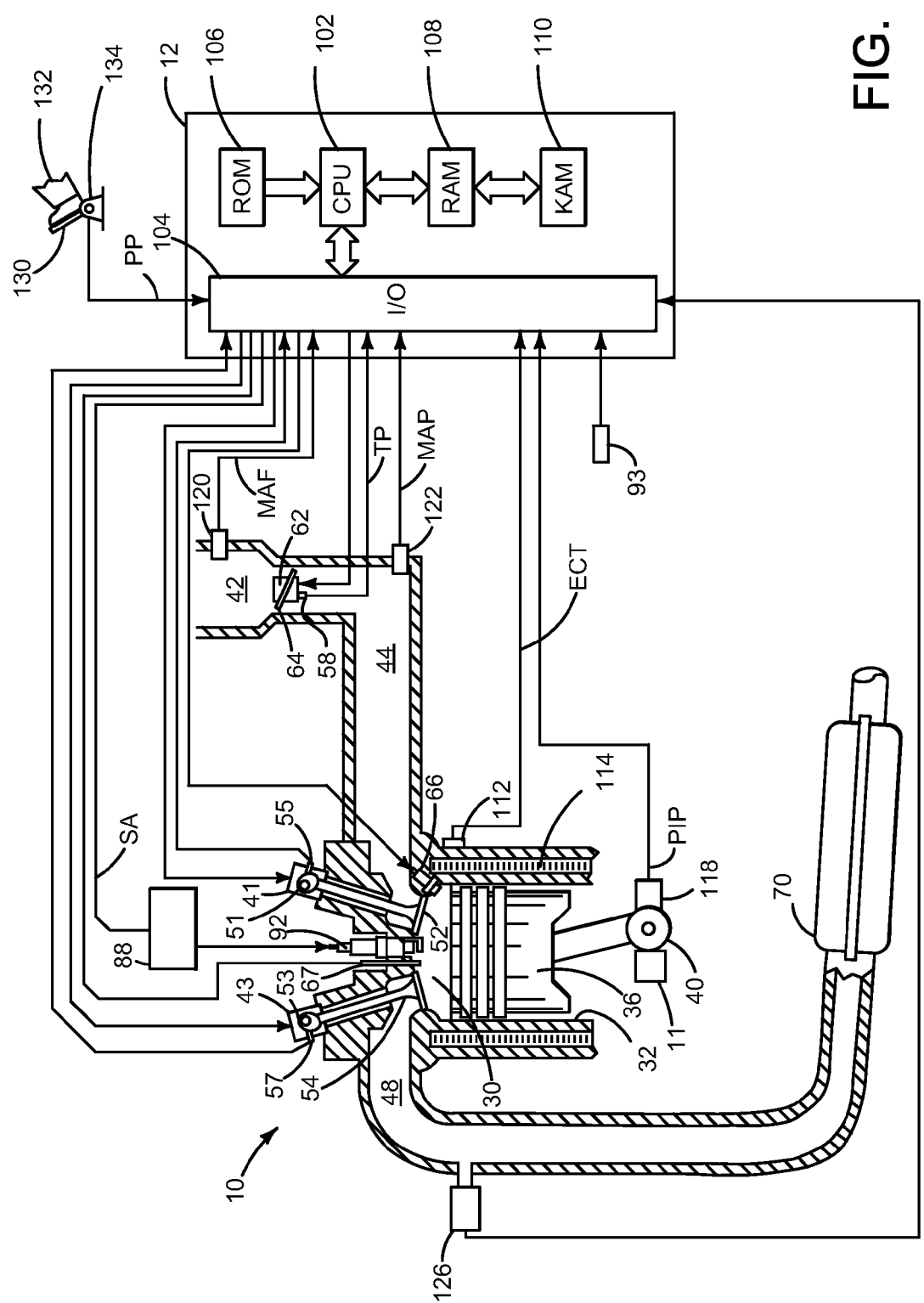
FIG. 1 is a schematic diagram of an engine.

The present description is related to selecting a cylinder for engine starting. The methods described herein may be useful for an engine that may stop at different positions each engine stop. Further, the method includes a way for adjusting how an engine is started during different starting conditions that may include starting the engine with one fuel rather than another fuel. In one example, the engine may be a spark ignited internal combustion engine as shown in FIG. 1. The engine of FIG. 1 may be started according to any of the sequences shown in FIGS. 2-6 depending on engine operating conditions. The method of FIG. 7 provides for starting the engine of FIG. 1 according to the sequences shown in FIGS. 2-6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Starter motor 11 may selectively engage and rotate crankshaft 40 during engine starting. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve timing (e.g., opening and closing) may be moved relative to a position of crankshaft 40 via cam indexing device 41. Exhaust valve timing (e.g., opening and closing) may be moved relative to a position of crankshaft 40 via cam indexing device 43.

Fuel injector 66 is shown positioned at the side of combustion chamber 30 to inject fuel directly into cylinder 30, which is known to those skilled in the art as direct injection. Fuel injector 66 delivers liquid fuel in proportion to the pulse width of signal from controller 12. Engine 10 may include a second centrally located fuel injector 67. Fuel injector 67 delivers liquid fuel in proportion to the pulse width of signal from controller 12. Fuel is delivered to fuel injectors 66 and 67 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed via sensor 93 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a V configuration engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for an engine system, comprising: an engine including a cylinder; a first direct fuel injector supplying fuel to the cylinder; and a controller including non-transitory instructions for adjusting a number of fuel injections to a cylinder and selecting the cylinder for a first combustion event in the cylinder since engine stop in response to a number of crankshaft degrees between the cylinder's stop position and the cylinder's top-dead-center compression stroke. The engine system further comprises additional instructions for adjusting a ratio of fuel between first and second fuel injections during a first cycle of the cylinder in response to the cylinder's intake valve closing position. The engine system includes where the non-transitory instructions include instructions for injecting fuel twice during a compression stroke of the cylinder.

In some examples, the engine system includes where the non-transitory instructions include instructions for injecting fuel only once during a compression stroke of the cylinder. The engine system includes where the non-transitory instructions include instructions for injecting fuel once during an intake stroke and once during compression stroke of the cylinder. The engine system further comprises a second direct fuel injector supplying fuel to the cylinder, and additional instructions for supplying a first fuel injection via the first direct fuel injector before the first combustion event since engine stop and additional instructions for supplying a second fuel injection via the second direct fuel injector before the first combustion event since engine stop.

Figure 2:
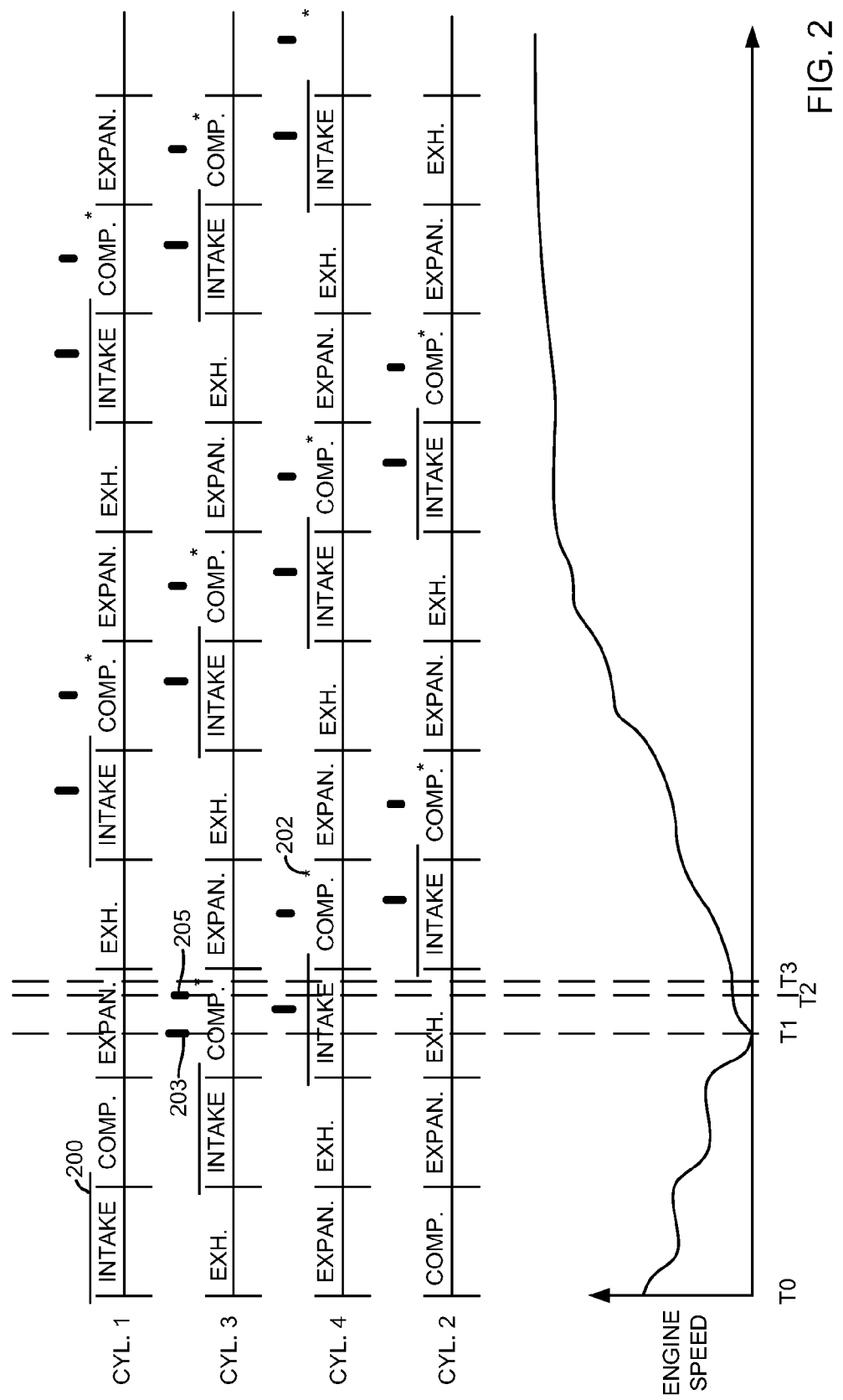
FIGS. 2-6 show example engine starting sequences.

Referring now to FIG. 2, a first example of a simulated engine starting sequence is shown. The sequence of FIG. 2 may be provided by the method of FIG. 7 in the system of FIG. 1. Vertical markers at times T1-T3 show times of interest during the sequence. The specific timings shown in FIG. 2 are for illustration purposes only and are not intended to limit the breadth or scope of the disclosure.

FIG. 2. includes four plots of cylinder strokes for a four cylinder engine having a firing order of 1-3-4-2. The cylinder strokes of cylinder number one are in the plot that has a Y axis labeled CYL 1. Likewise, cylinder strokes for the remaining cylinders 2-4 are similarly labeled. The X axis represents engine position during an engine starting sequence. The amount of time for the engine to proceed through each stroke varies with engine speed, but the stroke intervals (e.g., 180 crankshaft degrees) are always the same. Thus, the time interval may be longer for the first couple of cylinder strokes during engine cranking, but the time between cylinder strokes decreases as engine speed increases. The X axis of each cylinder's stroke is labeled to designate the present stroke each cylinder is on at a point in time. For example, the sequence begins on the left side of the figure with cylinder number one on an intake stroke and proceeds to the right side of the figure. At the same time, cylinder number three is on an exhaust stroke, cylinder number four is on an expansion stroke, and cylinder number two is on a compression stroke.

Intake valve opening timings for each of the four cylinders are indicated by the wide lines above each cylinder stroke. For example, line 200 represents intake valve opening time for cylinder number one. The intake valve opens near top-dead-center intake stroke and closes after bottom-dead-center compression stroke. Similar valve timings are shown for cylinders 2-4. Spark timing for each cylinder is represented by an * such as is shown at 202. Fuel injections are represented by the vertical bars above the cylinder strokes. For example, the vertical bar at 203 represents a first fuel injection during a compression stroke and vertical bar 205 represents a second fuel injection during the same compression stroke. The amount of fuel in each of the first two fuel injections is represented by the length of the vertical bars. The greater the length of the vertical bar, the more fuel is injected at the fuel injection event. Thus, a greater amount of fuel is injected at 203 than at 205. The fuel injections for the other engine cylinders are represented in a similar manner.

The fifth plot from the top of FIG. 2 shows engine speed versus engine position. The Y axis represents engine speed and engine speed increases in the direction of the Y axis arrow. The X axis represents engine position and the engine position is the same engine position as is shown for plots 1-4.

The sequence begins at time T0 where the engine is decelerating to zero speed. The engine may stop in response to a driver's request or in response to an automatic engine shutdown instituted by a controller. Fuel and spark are not provided to the engine cylinders as the engine speed is reduced to zero at time T1. The engine speed decays from time T0 to time T1 and the intake valves of the respective cylinders continue to operate. The engine position may be tracked as engine speed goes to zero so that engine position is known at engine starting time. Alternatively, an engine position sensor may output a unique value or signal for each engine crankshaft degree.

At time T1, the engine comes to a full stop and waits for an engine start request. The engine may be stopped at time T1 for a short or long period of time; however, the duration of time the engine is stopped is not reflected in the X axis of any of the five plots since the X axis of each plot is based on engine position. The engine start request may be initiated via a driver or a controller that automatically starts the engine without the driver providing input to a device that has a sole purpose of starting and/or stopping the engine (e.g., an ignition switch).

Upon receiving an engine start request, it is determined which cylinder is the first cylinder to receive fuel for a first combustion event since engine stop. In one example, a cylinder that is on its compression stroke (e.g., cylinder number three) is initially selected to be the first cylinder for a first combustion event since engine stop. The distance of the engine's stop position from top-dead-center compression stroke is determined from the sensed or tracked engine position at engine stop. In this example, the number of crankshaft degrees between the engine stopping position and top-dead-center compression stroke of the cylinder is the basis for selecting a number of fuel injections into the first cylinder for a first combustion event since engine stop. The number of crankshaft degrees is determined to be between second and third threshold crankshaft degree amounts. Therefore, two compression stroke injections are provided to the engine cylinder, cylinder number three, after the engine begins to rotate. The first fuel injection to the cylinder is at time T1 just before the engine begins to rotate; however, in some examples, the first fuel injection may be delayed until the engine is rotating.

Between time T1 and time T2, a first fuel injection to a second cylinder, cylinder number four, is provided. The second cylinder is the cylinder that hosts the second combustion event since stop. The first fuel injection into cylinder number four occurs during an intake stroke to improve fuel mixing within cylinder number four.

At time T2, the second fuel injection into cylinder number three occurs. The second fuel injection is made during the cylinder's compression stroke. By injecting fuel during the cylinder's compression stroke, it may be possible to control the air-fuel cloud near the spark plug to improve ignition and to provide more complete combustion. The second fuel injection amount is less than the first fuel injection amount during the compression stroke since the second fuel injection amount richens the fuel and air cloud around the spark plug.

At time T3, the air-fuel mixture within cylinder number three is ignited via a spark. Thus, the spark is provided after fuel is injected to the cylinder. The second fuel injection may start before the spark event and continue after the spark is discharged at the spark plug.

A second fuel injection is provided to cylinder number four for a first combustion event in cylinder number four since engine start. The first combustion event in cylinder number four since engine start is a second combustion event since engine stop. The second fuel injection into cylinder number four is provided during the compression stroke of cylinder number four. By splitting the total amount of fuel injected into cylinder number four, combustion and emissions from cylinder number four may be improved. Each of the other engine cylinders receives two fuel injection events during their respective cycles as the engine rotates. The fuel is injected during the intake and compression strokes of the cylinder receiving the fuel. The engine is shown accelerating as air-fuel mixtures within the cylinders are combusted.

Two compression stroke injections are provided to cylinder number three, the cylinder selected for a first combustion event since engine stop, so that the first fuel injection may mix with air in the cylinder while the second fuel injection adjusts the air-fuel mixture in the air-fuel cloud surrounding the spark plug. The two compression stroke fuel injections may improve combustion and emissions for the first cylinder to combust since engine stop.

Figure 3:
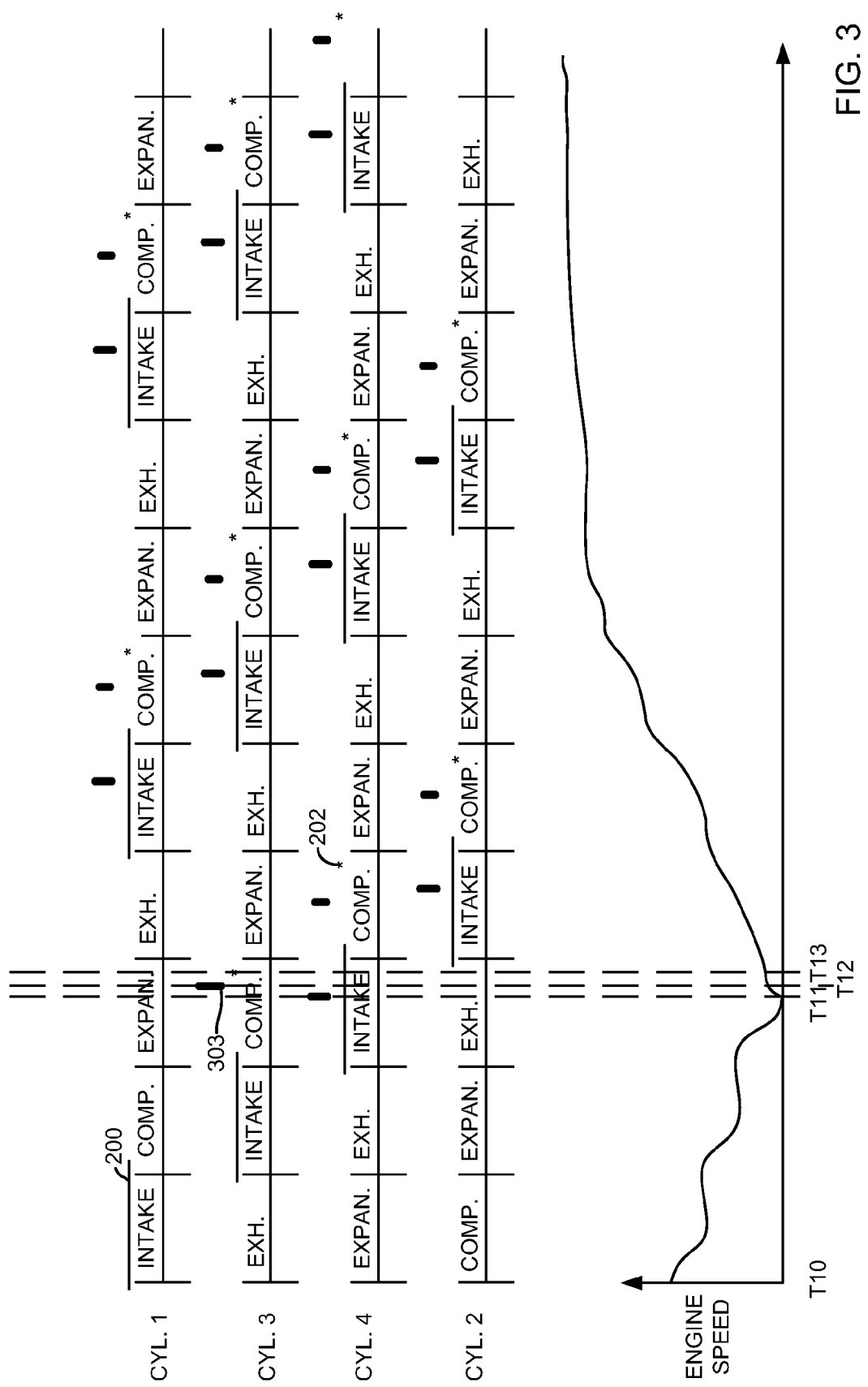

Referring now to FIG. 3, a second example engine starting sequence is provided. The engine starting sequence in FIG. 3 is similar to the starting sequence in FIG. 2. Further, the plots of FIG. 3 are similar to the plots of FIG. 2. Therefore, a description of the individual plots of FIG. 3 is omitted for the sake of brevity and the description in FIG. 2 applies to FIG. 3 except as indicated below. The sequence of FIG. 3 may also be performed by the method of FIG. 7 in the system of FIG. 1.

At time T10 the engine is decelerating toward zero speed. The engine is decelerating in response to a request to stop the engine. Spark and fuel supplied to the engine cylinders is deactivated while the engine is decelerating. The engine fully stops at time T11; however, the engine stops at a position that is closer to top-dead-center compression stroke of cylinder number three as compared to the position the engine stopped in the example of FIG. 2.

At time T11, the engine comes to a full stop and waits for an engine start request. The engine may be stopped at time T11 for a short or long period of time. Upon receiving an engine start request, it is determined which cylinder is the first cylinder to receive fuel for a first combustion event since engine stop. In this example, a cylinder that is on its compression stroke (e.g., cylinder number three) is initially selected to be the first cylinder for a first combustion event since engine stop. The distance of the engine's stop position from top-dead-center compression stroke is determined from the sensed or tracked engine position at engine stop. In this example, the number of crankshaft degrees between the engine stopping position and top-dead-center compression stroke of the cylinder is the basis for selecting a number of fuel injections into the first cylinder for a first combustion event since engine stop. The number of crankshaft degrees is determined to be between first and second threshold crankshaft degree amounts. Therefore, a single sole compression stroke injection is provided to the engine cylinder, cylinder number three, at time T12. The first fuel injection to the cylinder is at time T12 just after the engine begins to rotate; however, in some examples, the first fuel injection may be when the engine is stopped. In this example, a first injection is provided to cylinder number four at time T11. Injecting fuel at time T11 may improve air-fuel mixing in the second cylinder to combust since engine stop.

At time T12, the first fuel injection into cylinder number three occurs. The first fuel injection is made during the cylinder's compression stroke. By injecting fuel during the cylinder's compression stroke, it may be possible to accelerate the engine without a long cranking period. A second fuel injection into cylinder number three is not provided since engine speed is low and since a second amount of fuel injected to the cylinder may not mix as thoroughly as is desired. The amount of fuel injected is increased over the amount of fuel injected in the first fuel injection to cylinder number three shown in FIG. 2 so that the cylinder air-fuel ratio may be near stoichiometry even though only a single compression stroke injection is provided.

At time T13, the air-fuel mixture within cylinder number three is ignited via a spark. Thus, the spark is provided after fuel is injected to the cylinder. The second fuel injection may start before the spark event and continue after the spark is discharged at the spark plug.

A second fuel injection is provided to cylinder number four for a first combustion event in cylinder number four since engine start. The first combustion event in cylinder number four since engine start is a second combustion event since engine stop. The second fuel injection into cylinder number four is provided during the compression stroke of cylinder number four. Each of the other engine cylinders receives two fuel injection events during their respective cycles as the engine rotates. The fuel is injected during the intake and compression strokes of the cylinder receiving the fuel. The engine is shown accelerating as air-fuel mixtures within the cylinders are combusted.

Figure 4:
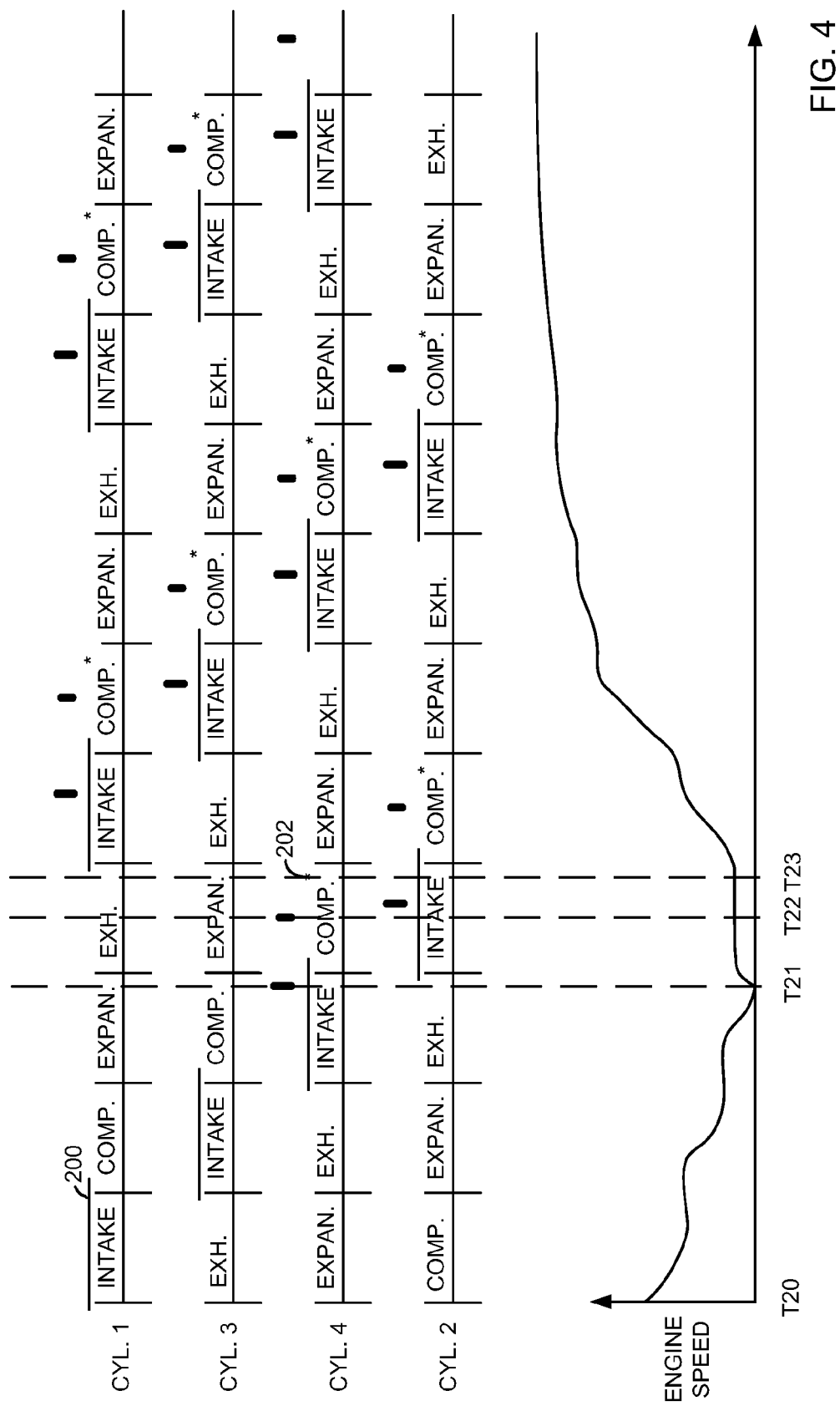

Referring now to FIG. 4, a third example engine starting sequence is provided. The engine starting sequence in FIG. 4 is similar to the starting sequence in FIG. 2. Further, the plots of FIG. 4 are similar to the plots of FIG. 2. Therefore, a description of the individual plots of FIG. 4 is omitted for the sake of brevity and the description in FIG. 2 applies to FIG. 4 except as indicated below. The sequence of FIG. 4 may also be performed by the method of FIG. 7 in the system of FIG. 1.

At time T20 the engine is decelerating toward zero speed. The engine is decelerating in response to a request to stop the engine. Spark and fuel supplied to the engine cylinders is deactivated while the engine is decelerating. The engine fully stops at time T21; however, the engine stops at a position that is closer to top-dead-center compression stroke of cylinder number three as compared to the position the engine stopped in the examples of FIGS. 2 and 3.

At time T21, the engine comes to a full stop and waits for an engine start request. The engine may be stopped at time T21 for a short or long period of time. Upon receiving an engine start request, it is determined which cylinder is the first cylinder to receive fuel for a first combustion event since engine stop. In this example, a cylinder that is on its compression stroke (e.g., cylinder number three) is initially selected to be the first cylinder for a first combustion event since engine stop. The distance of the engine's stop position from top-dead-center compression stroke is determined from the sensed or tracked engine position at engine stop. In this example, the number of crankshaft degrees between the engine stopping position and top-dead-center compression stroke of the cylinder is the basis for selecting a number of fuel injections into the first cylinder for a first combustion event since engine stop. The number of crankshaft degrees is determined to be less than a first threshold crankshaft degree amount. Therefore, the next cylinder in the firing order (e.g., 1-3-4-2 for the present four cylinder engine) is selected to be the first cylinder to receive fuel and to host a first combustion event since engine stop. Consequently, fuel is injected to cylinder number four at time T21 before the engine begins to rotate, but in some examples the first fuel injection may be after the engine begins to rotate. By selecting a next cylinder in the engine's combustion order, engine cranking time may be slightly increased, but since the engine is already close to top-dead-center compression stroke of cylinder number three, the delay may be reduced while engine combustion stability and emissions are improved. Specifically, by injecting fuel during the intake stroke of cylinder number four, air and fuel mixing may be improved. The engine rotates between time T21 and time T22.

At time T22, the second fuel injection into cylinder four occurs. The second fuel injection is made during the cylinder's compression stroke. By injecting fuel during the cylinder's compression stroke, it may be possible to improve combustion stability during engine run-up. The second fuel injection amount is less than the first fuel injection amount since the first fuel amount injected is mixed relatively well due to the large amount of mixing time between the first and second fuel injections.

At time T23, the air-fuel mixture within cylinder number four is ignited via a spark. Thus, the spark is provided after fuel is injected to the cylinder. The second fuel injection may start before the spark event and continue after the spark is discharged at the spark plug.

Thus, if the engine is positioned close to top-dead-center of a cylinder on its compression stroke, the next cylinder in the engine combustion order may be selected for a first combustion event since engine stop. The next cylinder is selected to improve combustion stability and reduce engine emissions.

Figure 5:
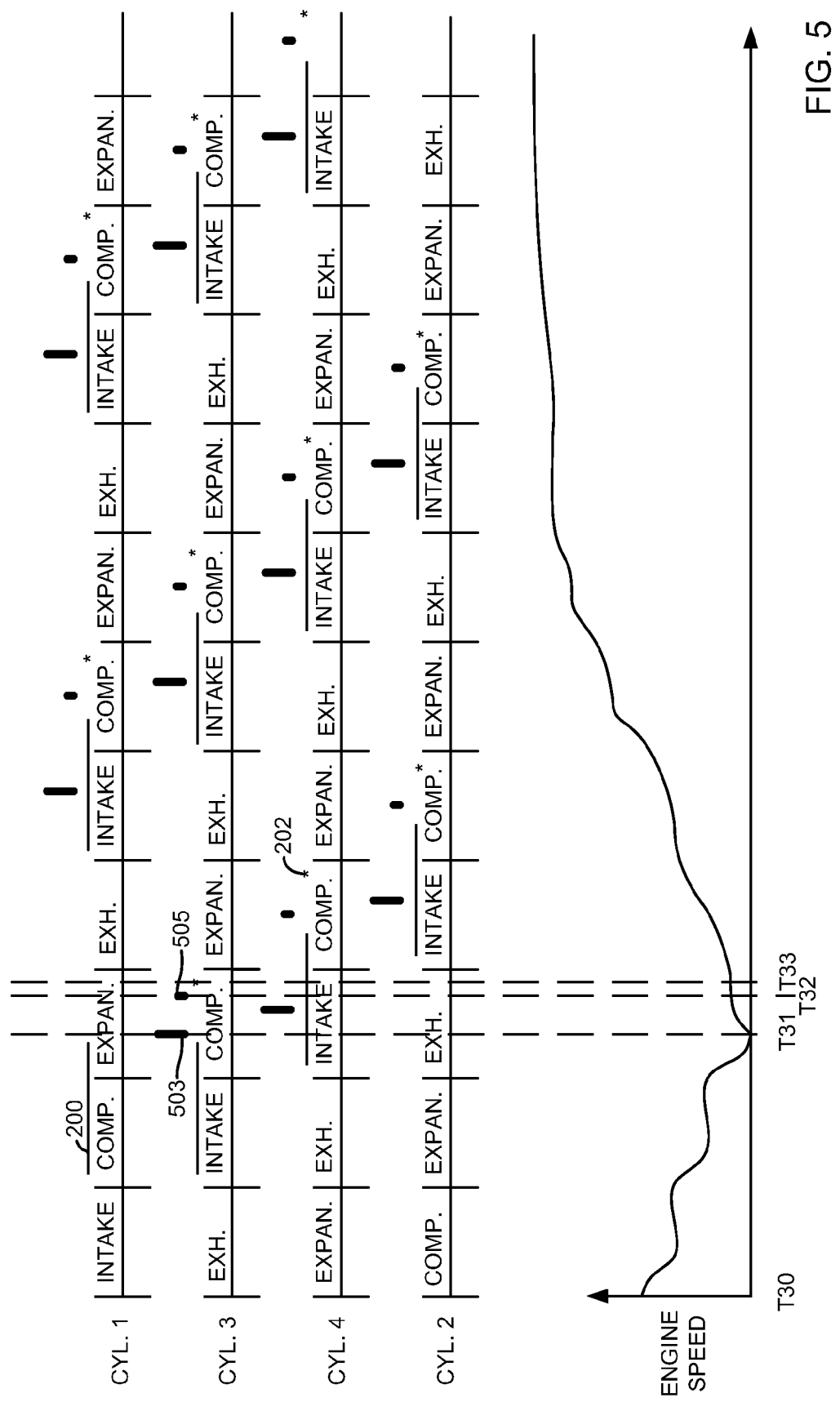

Referring now to FIG. 5, a fourth example engine starting sequence is provided. The engine starting sequence in FIG. 5 is similar to the starting sequence in FIG. 2. Further, the plots of FIG. 5 are similar to the plots of FIG. 2. Therefore, a description of the individual plots of FIG. 5 is omitted for the sake of brevity and the description in FIG. 2 applies to FIG. 5 except as indicated below. The sequence of FIG. 5 may also be performed by the method of FIG. 7 in the system of FIG. 1.

The difference between the example of FIG. 5 and the example of FIG. 2 is that the intake valve closing timing is retarded in the example of FIG. 5. Consequently, the fuel amount ratio between the first and second fuel injections provided to the first cylinder selected to host a first combustion event since engine is adjusted.

At time T30, the engine is decelerating toward zero speed. The engine may stop in response to a driver's request or in response to an automatic engine shutdown instituted by a controller. Fuel and spark are not provided to the engine cylinders as the engine speed is reduced to zero at time T31. The engine speed decays from time T30 to time T31 and the intake valves of the respective cylinders continue to operate. The engine position may be tracked as engine speed goes to zero so that engine position is known at engine starting time. Alternatively, an engine position sensor may output a unique value or signal for each engine crankshaft degree.

At time T31, the engine comes to a full stop and waits for an engine start request. The engine may be stopped at time T31 for a short or long period of time. Upon receiving an engine start request, it is determined which cylinder is the first cylinder to receive fuel for a first combustion event since engine stop. In this example, cylinder number three is on its compression stroke and it is selected to be the first cylinder for a first combustion event since engine stop. The distance of the engine's stop position from top-dead-center compression stroke is determined from the sensed or tracked engine position at engine stop. In this example, the number of crankshaft degrees between the engine stopping position and top-dead-center compression stroke of the cylinder is the basis for selecting a number of fuel injections into the first cylinder for a first combustion event since engine stop. The number of crankshaft degrees is determined to be between second and third threshold crankshaft degree amounts. Therefore, two compression stroke injections are provided to the engine cylinder, cylinder number three, after the engine begins to rotate. Additionally, the location or position of intake valve closing (IVC) is determined. Based on IVC a ratio of the amounts of fuel injected to the first cylinder hosting a first combustion event since engine stop, the amounts of fuel in the first and second injections to cylinder number three are adjusted. In this example, IVC is retarded as compared to the IVC time shown in FIG. 2. Therefore, the amount of fuel injected in the first fuel injection to cylinder number three is increased. The amount of fuel injected in the first fuel injection is increased as compared to the amount of fuel injected during the first injection of FIG. 2 because there may be less trapped exhaust gas in the cylinder.

Between time T31 and time T32, a first fuel injection to a second cylinder, cylinder number four, is provided. The second cylinder is the cylinder that hosts the second combustion event since stop, cylinder number four in this example. The first fuel injection into cylinder number four occurs during an intake stroke to improve fuel mixing within cylinder number four.

At time T32, the second fuel injection into cylinder number three occurs. The second fuel injection is made during the cylinder's compression stroke. The second fuel injection amount is less than the second fuel injection amount in the example of FIG. 2 since the amount of fuel injected during the first injection to cylinder number three was increased. The total amount of fuel injected may be the same amount for the first combustion event in FIG. 2 and the first combustion event in FIG. 3.

At time T33, the air-fuel mixture within cylinder number three is ignited via a spark. Thus, the spark is provided after fuel is injected to the cylinder. The second fuel injection may start before the spark event and continue after the spark is discharged at the spark plug.

A second fuel injection is provided to cylinder number four for a first combustion event in cylinder number four since engine start a short time later. The first combustion event in cylinder number four since engine start is a second combustion event since engine stop. The second fuel injection into cylinder number four is provided during the compression stroke of cylinder number four. Each of the other engine cylinders receives two fuel injection events during their respective cycles as the engine rotates. The fuel is injected during the intake and compression strokes of the cylinder receiving the fuel. The engine is shown accelerating as air-fuel mixtures within the cylinders are combusted.

The ratio of fuel amounts between the first and second injections of the first cylinder hosting a combustion event since engine stop is adjusted to account for the increase or decrease in residual gases in the first cylinder hosting combustion since engine stop. If IVC is adjusted to increase residuals in the cylinder, the first injection amount is decreased and the second fuel injection amount is increased. If IVC is adjusted to decrease residuals in the cylinder, the first fuel injection amount is increased and the second fuel injection amount is decreased.

Figure 6:
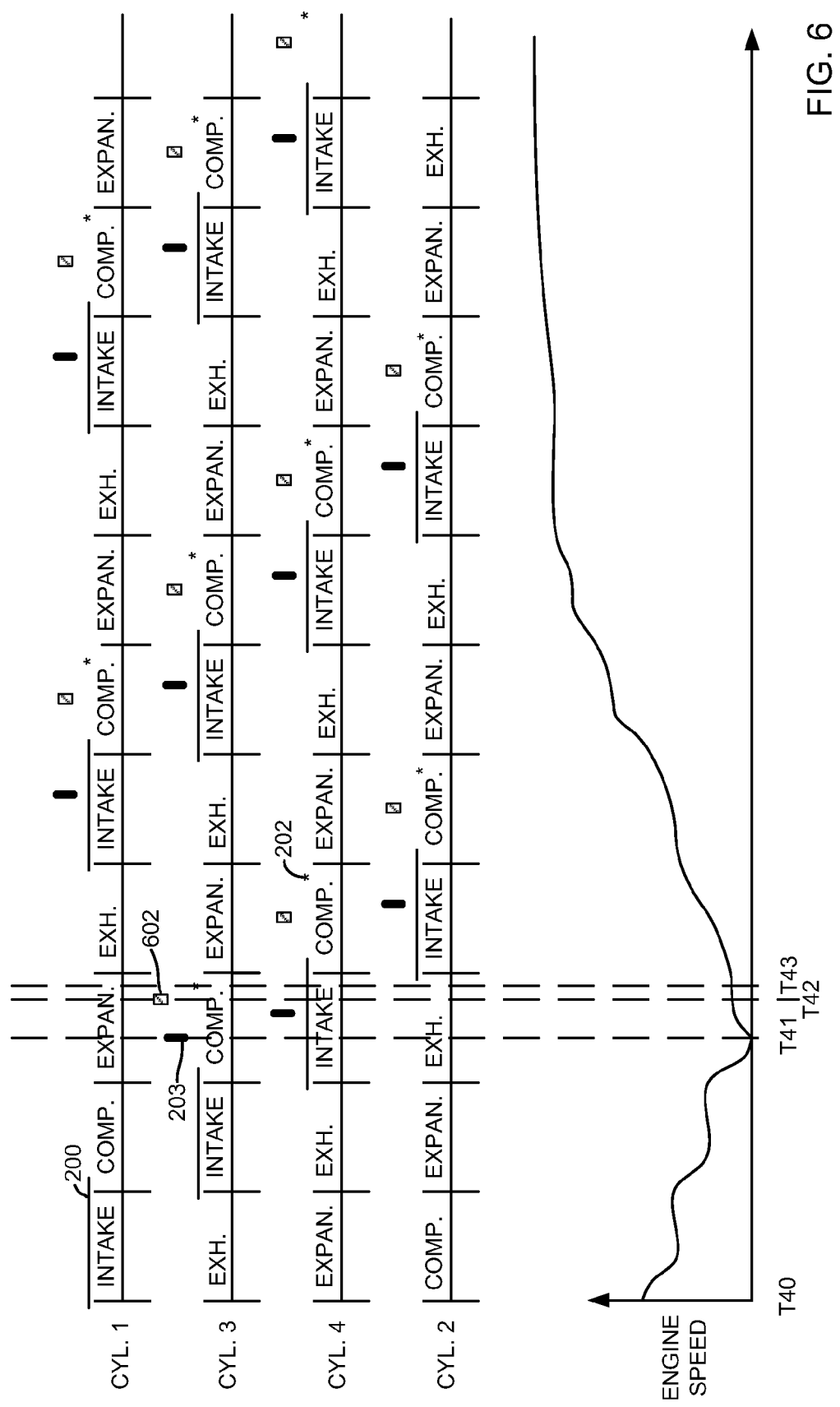
Figure 7:
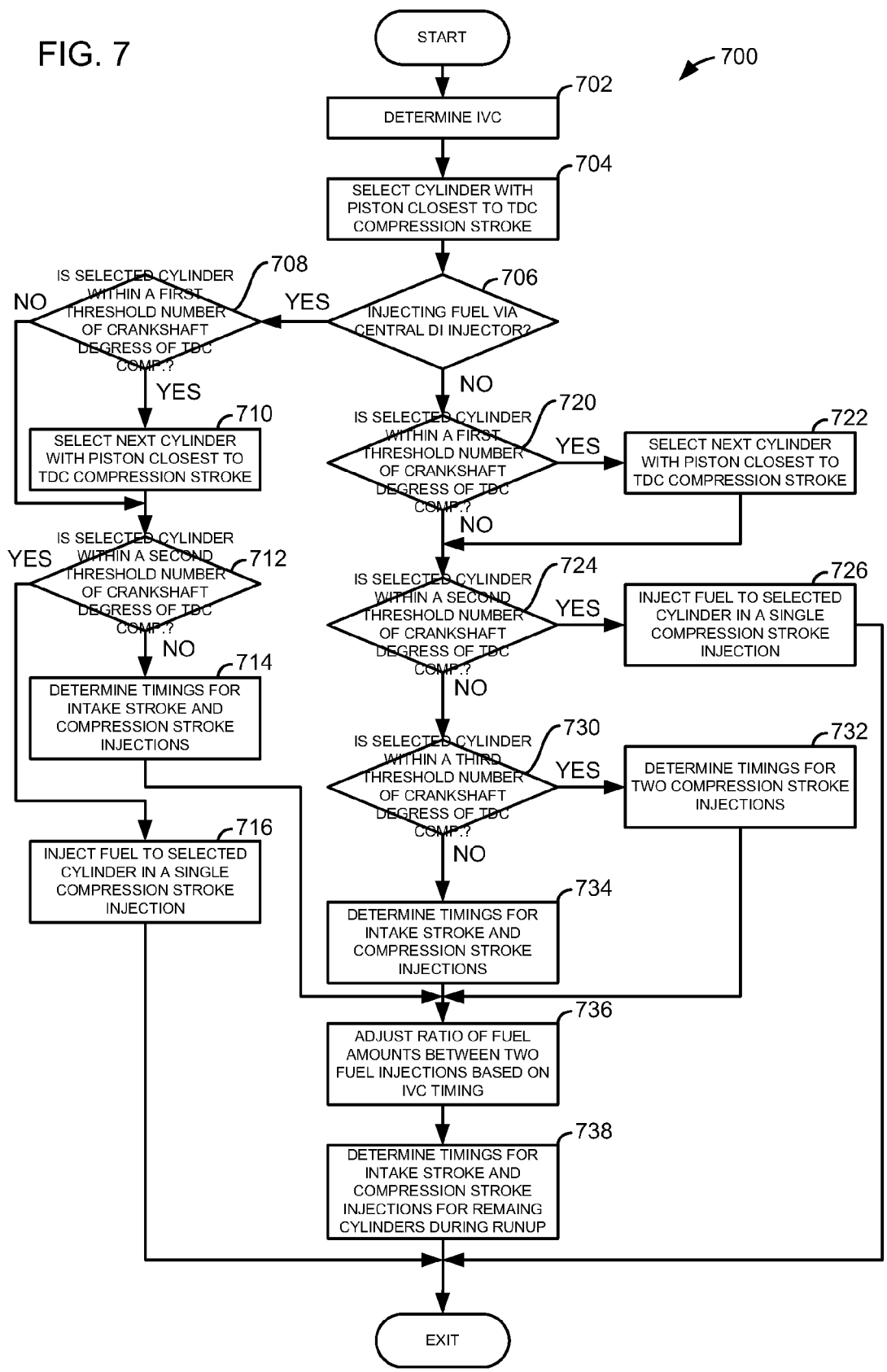
FIG. 7 is a flowchart of an example method for starting an engine.

Referring now to FIG. 6, a fifth example engine starting sequence is provided. The engine starting sequence in FIG. 6 is similar to the starting sequence in FIG. 2. Further, the plots of FIG. 6 are similar to the plots of FIG. 2. Therefore, a description of the individual plots of FIG. 6 is omitted for the sake of brevity and the description in FIG. 2 applies to FIG. 6 except as indicated below. The sequence of FIG. 6 may also be performed by the method of FIG. 7 in the system of FIG. 1.

The difference between the example of FIG. 6 and the example of FIG. 2 is that fuel may be injected via a centrally located fuel injector as well as by a side located fuel injector. Consequently, the fuel supplied to the cylinder may be split delivered via the two differently located fuel injectors. Fuel injected by the side injector is illustrated as a vertical line 203 and the fuel injected by the centrally located injector is illustrated as a bar 602.

At time T40, the engine is decelerating toward zero speed. The engine may stop in response to a driver's request or in response to an automatic engine shutdown instituted by a controller. Fuel and spark are not provided to the engine cylinders as the engine speed is reduced to zero at time T41. The engine speed decays from time T40 to time T41 and the intake valves of the respective cylinders continue to operate. The engine position may be tracked as engine speed goes to zero so that engine position is known at engine starting time. Alternatively, an engine position sensor may output a unique value or signal for each engine crankshaft degree.

At time T41, the engine comes to a full stop and waits for an engine start request. The engine may be stopped at time T41 for a short or long period of time. Upon receiving an engine start request, it is determined which cylinder is the first cylinder to receive fuel for a first combustion event since engine stop. In this example, cylinder number three is on its compression stroke and it is selected to be the first cylinder for a first combustion event since engine stop. The distance of the engine's stop position from top-dead-center compression stroke is determined from the sensed or tracked engine position at engine stop. In this example, the number of crankshaft degrees between the engine stopping position and top-dead-center compression stroke of the cylinder is the basis for selecting a number of fuel injections into the first cylinder for a first combustion event since engine stop. The number of crankshaft degrees is determined to be between second and third threshold crankshaft degree amounts. Therefore, two compression stroke injections are provided to the engine cylinder, cylinder number three, after the engine begins to rotate. The first compression stroke injection is performed by the side located fuel injector and the second compression stroke injection is performed by the centrally located fuel injector. In one example, the side located fuel injector supplies fuel having a higher concentration of alcohol than the centrally located fuel injector. The centrally located fuel injector may supply fuel having a higher concentration of gasoline. The first fuel injection of the fuel higher in alcohol concentration improves fuel vaporization while the second fuel injection improves ignition of the air-fuel mixture and combustion stability.

Between time T41 and time T42, a first fuel injection to a second cylinder, cylinder number four, is provided. The second cylinder is the cylinder that hosts the second combustion event since stop, cylinder number four in this example. The first fuel injection into cylinder number four occurs during an intake stroke to improve fuel mixing and vaporization within cylinder number four.

At time T42, the second fuel injection into cylinder number three occurs. The second fuel injection is provided by the centrally located fuel injector during the cylinder's compression stroke. The second fuel injection amount is less than the first fuel amount injected at time T41, but in some examples the second injected fuel amount may be greater than the first injected fuel amount depending on engine operating conditions.

At time T43, the air-fuel mixture within cylinder number three is ignited via a spark. Thus, the spark is provided after fuel is injected to the cylinder. The second fuel injection may start before the spark event and continue after the spark is discharged at the spark plug.

A second fuel injection is provided to cylinder number four for a first combustion event in cylinder number four since engine start a short time later. The first combustion event in cylinder number four since engine start is a second combustion event since engine stop. The second fuel injection into cylinder number four is provided during the compression stroke of cylinder number four. Each of the other engine cylinders receives two fuel injection events during their respective cycles as the engine rotates. The fuel is injected during the intake and compression strokes of the cylinder receiving the fuel. The engine is shown accelerating as air-fuel mixtures within the cylinders are combusted.

Referring now to FIG. 7, a method for starting a stopped engine is shown. The method of FIG. 7 may be applied to the system of FIG. 1. The method of FIG. 7 may provide the operating sequences shown in FIGS. 2-6. Additionally, the method of FIG. 7 may be stored as executable instructions in non-transitory memory of a controller as shown in FIG. 1.

At 702, method 700 determines intake valve closing timing (IVC). The intake valve closing timing may be determined from a position of an intake camshaft. Alternatively, the intake valve closing timing may be determined via indexing a table or a function that outputs IVC based on one or more of parameters including engine speed, driver demand torque, engine temperature, engine position, and intake cam position. If the engine does not include an intake cam (e.g., electrically actuated valves), the IVC location may be determined via indexing a table or function using engine temperature, engine speed, and driver demand torque. Method 700 proceeds to 704 after IVC is determined.

At 704, method 700 determines an engine cylinder that is closest to its top-dead-center compression stroke without being in the cylinder's expansion stroke. In one example, engine position is determined via crankshaft and camshaft positions. The absolute engine position may be referenced to a specific engine position such as top-dead-center compression stroke for cylinder number one. The specific strokes of each cylinder are determined by indexing a table using the absolute engine position to determine the respective strokes of each cylinder. If more than one cylinder is in its compression stroke, the cylinder closest to its top-dead-center compression stroke without being in an expansion stroke is selected. Method 700 proceeds to 706 after the engine cylinder in a compression stroke is selected.

At 706, method 700 judges whether or not fuel is to be injected solely using a centrally located fuel injector. In one example, method 700 judges whether or not fuel is to be injected via a centrally located injector based on a status of a variable stored in memory. If method 700 judges that fuel is to be injected solely via a centrally located fuel injector, the answer is yes and method 700 proceeds to 708. Otherwise, the answer is no and method 700 proceeds to 720.

At 720, method 700 judges whether or not the engine cylinder selected at 704 is within a first threshold number of crankshaft degrees of top-dead-center (TDC) compression stroke of the selected cylinder. For example, if the selected cylinder is within (e.g., advanced) twenty crankshaft degrees of TDC, the answer is yes and method 700 proceeds to 722. Otherwise, the answer is no and method 700 proceeds to 724.

At 722, method 700 selects a next cylinder in the order of combustion for the engine. For example, if the engine is a four cylinder engine with a firing order of 1-3-4-2, and cylinder number two was selected at 704, cylinder number one is selected at 722. Method 700 proceeds to 724 after the cylinder is selected.

At 724, method 700 judges whether or not the selected cylinder (e.g., the cylinder selected at 704 or the cylinder selected at 722) is within a second threshold number of crankshaft degrees of TDC without being on an expansion stroke. For example, if the selected cylinder is within (e.g., advanced) one hundred and twenty crankshaft degrees of TDC, the answer is yes and method 700 proceeds to 726. Otherwise, the answer is no and method 700 proceeds to 730.

At 726, method 700 injects fuel to the selected cylinder in a single compression stroke injection. The single compression stroke injection may be provided before the engine rotates or while the engine is rotating. Further, the crankshaft degree that the fuel start of injection occurs at may be adjusted based on engine temperature and the concentration of alcohol in the fuel. The selected cylinder is the first engine cylinder to host a combustion event since engine stop. Method 700 rotates the engine, injects fuel to the selected cylinders, and fuels the remaining cylinders by injecting fuel to each of the cylinders during the cylinder's intake and compression strokes as is illustrated in FIGS. 2-6. Method 700 proceeds to exit after fuel is provided to the engine cylinders.

At 730, method 700 judges whether or not the selected cylinder (e.g., the cylinder selected at 704 or the cylinder selected at 722) is within a third threshold number of crankshaft degrees of TDC without being on an expansion stroke. For example, if the selected cylinder is within (e.g., advanced) two hundred crankshaft degrees of TDC, the answer is yes and method 700 proceeds to 732. Otherwise, the answer is no and method 700 proceeds to 734.

At 732, method 700 determines timings for injecting fuel twice during the selected cylinder's compression stroke. In one example, the timings for the first and second fuel injections may be empirically determined and stored in tables and/or functions. The tables and or functions may be indexed using engine operating conditions such as engine temperature and alcohol content of the injected fuel. The two injection timings may be at different crankshaft angles during the cylinder's compression stroke.

In some examples, the fuel may be injected via a side positioned fuel injector or via the side positioned fuel injector and a centrally located fuel injector. If the centrally located fuel injector is injecting fuel having a lower concentration of alcohol than the side positioned fuel injector, the side positioned fuel injector may provide the first fuel injection and the centrally located fuel injector may provide the second fuel injection. By injecting fuel via the centrally positioned fuel injector rather than the side fuel injector for the second fuel injection, richening of the fuel cloud within the cylinder may be localized near the spark plug to improve combustion stability. Method 700 may judge when to supply fuel to the cylinder using the side and centrally located fuel injectors in response to engine temperature and/or other engine operating conditions. Method 700 proceeds to 736 after timing for the two compression fuel injections is determined.

At 734, method 700 determines timings for injecting fuel once during the selected cylinder's intake stroke and one or more times during the cylinder's compression stroke. In one example, the timings for the first and second fuel injections may be empirically determined and stored in tables and/or functions. The tables and or functions may be indexed using engine operating conditions such as engine temperature and alcohol content of the injected fuel.

In some examples, the fuel may be injected via a side positioned fuel injector or via the side positioned fuel injector and a centrally located fuel injector. If the centrally located fuel injector is injecting fuel having a lower concentration of alcohol than the side positioned fuel injector, the side positioned fuel injector may provide the first fuel injection and the centrally located fuel injector may provide the second fuel injection. By injecting fuel via the centrally positioned fuel injector rather than the side fuel injector for the second fuel injection, richening of the fuel cloud within the cylinder may be localized near the spark plug to improve combustion stability. Method 700 proceeds to 736 after timing for the two compression fuel injections is determined.

At 736, method 700 adjusts a ratio (e.g., amount of first fuel injection divided by amount of second fuel injection during a cylinder cycle) of fuel amounts provided between two or more injections during a cycle of a cylinder based on IVC timing. In one example, the amount of fuel in the first fuel injection during the cylinder cycle is increased as IVC is retarded. The amount of fuel in the first fuel injection during the cylinder cycle is decreased as IVC is advanced. The amount of fuel in the second fuel injection during the cylinder cycle is decreased as IVC is retarded so that the total amount of fuel injected remains the same. The amount of fuel in the second fuel injection during the cylinder cycle is increased as IVC is advanced so that the total amount of fuel injected remains the same. Method 700 proceeds to 738 after the ratio of fuel in the first and second fuel injections during the first cycle of the selected cylinder are adjusted.

At 738, method 700 determines timings for intake and compression strokes of cylinders other than the selected cylinder. In one example, the timings for the first and second fuel injections for the remaining cylinders may be empirically determined and stored in tables and/or functions. The tables and or functions may be indexed using engine operating conditions such as engine temperature and alcohol content of the injected fuel. Method 700 proceeds to exit after the timings of fuel injections for the remaining cylinders are determined.

At 708, method 700 judges whether or not the engine cylinder selected at 704 is within a first threshold number of crankshaft degrees of top-dead-center (TDC) compression stroke of the selected cylinder. For example, if the selected cylinder is within (e.g., advanced) twenty five crankshaft degrees of TDC, the answer is yes and method 700 proceeds to 710. Otherwise, the answer is no and method 700 proceeds to 712.

At 710, method 700 selects a next cylinder in the order of combustion for the engine. For example, if the engine is a four cylinder engine with a firing order of 1-3-4-2, and cylinder number two was selected at 704, cylinder number one is selected at 710. Method 700 proceeds to 712 after the cylinder is selected.

At 712, method 700 judges whether or not the selected cylinder (e.g., the cylinder selected at 704 or the cylinder selected at 710) is within a second threshold number of crankshaft degrees of TDC without being on an expansion stroke. For example, if the selected cylinder is within (e.g., advanced) one hundred and twenty five crankshaft degrees of TDC, the answer is yes and method 700 proceeds to 716. Otherwise, the answer is no and method 700 proceeds to 714.

At 714, method 700 determines timings for injecting fuel once during the selected cylinder's intake stroke and once during the cylinder's compression stroke. In one example, the timings for the first and second fuel injections may be empirically determined and stored in tables and/or functions. The tables and or functions may be indexed using engine operating conditions such as engine temperature and alcohol content of the injected fuel. Method 700 proceeds to 736 after the injection timings are determined.

At 716, method 700 injects fuel to the selected cylinder in a single compression stroke injection. The single compression stroke injection may be provided before the engine rotates or while the engine is rotating. Further, the crankshaft degree that the fuel start of injection occurs at may be adjusted based on engine temperature and the concentration of alcohol in the fuel. The selected cylinder is the first engine cylinder to host a combustion event since engine stop. Method 700 rotates the engine, injects fuel to the selected cylinders, and fuels the remaining cylinders by injecting fuel to each of the cylinders during the cylinder's intake and compression strokes as is illustrated in FIGS. 2-6. Fuel injected to the cylinder via the cylinder's centrally located fuel injector may move less around the cylinder's spark plug so that the air-fuel cloud in the cylinder provides an ignitable mixture near the spark plug. Thus, only one fuel injection may be desirable when the engine cylinder is with a predetermined number of crankshaft degrees of the cylinder's TDC compression stroke. On the other hand, if the cylinder had only a side positioned injector, multiple injections may be desirable to ensure an ignitable mixture at the spark plug. Method 700 proceeds to exit after fuel is provided to the engine cylinders.

The fuel injection timings described in FIG. 7 may occur before a spark is provided to the selected cylinder via an ignition system. In some examples, the second or greater number injection event overlaps with when the spark is provided to the cylinder.

The method of FIG. 7 is used to describes the selecting of a cylinder based on the cylinder's proximity to TDC compression stroke of the cylinder. However, in other examples, the cylinder may be selected based on the cylinders proximity to another engine position. For example, the cylinder may be selected based on the cylinder's proximity to its intake valve closing timing. Thus, selection of the cylinder for a first combustion event since engine stop may be based on engine positions other than the cylinder's position relative to the cylinder's TDC compression stroke.

Thus, the method of FIG. 7 provides for starting an engine, comprising: selecting a cylinder and providing two fuel injections during a compression stroke of the cylinder for a first combustion event since engine stop in response to a piston of the cylinder being within a third threshold number of crankshaft degrees before the cylinder's TDC compression stroke; and adjusting a ratio of fuel between the two fuel injections in response to intake valve closing timing. The method includes where an amount of fuel injected during a first injection of the two fuel injections is increased in response to intake valve closing timing being retarded, and where the two fuel injections during a compression stroke of the cylinder begin before a spark is provided to the cylinder.

In some examples, the method includes where an amount of fuel injected during a first injection of the two fuel injections is decreased in response to intake valve closing timing being advanced. The method includes where an amount of fuel injected during a second injection of the two fuel injections is decreased in response to intake valve closing timing being retarded. The method also includes where an amount of fuel injected during a second injection of the two fuel injections is increased in response to intake valve closing timing being advanced.

The method further comprises selecting a next cylinder to receive fuel for a first combustion event since engine stop according to an order of combustion of the engine in response to the cylinder being within a first threshold number of crankshaft degrees before the cylinder's TDC compression stroke, the first threshold number of crankshaft degrees less than the third threshold number of crankshaft degrees. The method includes where the first of the two fuel injections is provided by a cylinder side located direct fuel injector and where the second of the two fuel injections is provided by a cylinder centrally located direct fuel injector. The method includes where the second of the two fuel injections is provided by the centrally located direct fuel injector in response to engine temperature.

The method of FIG. 7 also provides for starting an engine, comprising: selecting a cylinder and providing a single fuel injection to the cylinder during a compression stroke of the cylinder for a first combustion event since engine stop in response to a piston of the cylinder being within a second threshold number of crankshaft degrees before the cylinder's top-dead-center (TDC) compression stroke; selecting the cylinder and providing two fuel injections during the compression stroke of the cylinder for a first combustion event since engine stop in response to the piston of the cylinder being within a third threshold number of crankshaft degrees before the cylinder's TDC compression stroke; and selecting the cylinder and providing a single intake stroke and one or more compression stroke fuel injections for a first combustion event since engine stop in response to the piston of the cylinder not being within the third threshold number of crankshaft degrees before the cylinder's TDC compression stroke.

The method further comprises adjusting a ratio of fuel between the two fuel injections during the compression stroke of the cylinder in response to intake valve closing timing. The method further comprises selecting a next cylinder in an order of combustion of the engine in response to the cylinder being within a first threshold number of crankshaft degrees before the cylinder's TDC compression stroke, the first threshold number of crankshaft degrees less than the second number of crankshaft degrees. The method includes where the a single fuel injection to the cylinder during a compression stroke of the cylinder, the two fuel injections during the compression stroke of the cylinder, and the single intake stroke and one or more compression stroke fuel injections occur before a spark is provided to the cylinder. In some examples, the method further comprises automatically restarting the engine. The method includes where the second threshold number of crankshaft degrees is less than the third threshold number of crankshaft degrees.

As will be appreciated by one of ordinary skill in the art, the method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, full electric or partially electric driven powertrains could use the present description to advantage. Further, the system and methods described herein may be used to advantage with various engine configurations not limited to I4, V6, V8, V10, V12, and I6 engine configurations.

The invention claimed is:

1. A method for starting an engine, comprising:
    selecting a cylinder and providing a single fuel injection to the cylinder during a compression stroke of the cylinder for a first combustion event since engine stop in response to a piston of the cylinder being within a second threshold number of crankshaft degrees before the cylinder's top-dead-center (TDC) compression stroke;
    selecting the cylinder and providing two fuel injections during the compression stroke of the cylinder for a first combustion event since engine stop in response to the piston of the cylinder being within a third threshold number of crankshaft degrees before the cylinder's TDC compression stroke; and
    selecting the cylinder and providing a single intake stroke and one or more compression stroke fuel injections for a first combustion event since engine stop in response to the piston of the cylinder not being within the third threshold number of crankshaft degrees before the cylinder's TDC compression stroke and not being within the second threshold number of crankshaft degrees before the cylinder's TDC compression stroke.

2. The method of claim 1, further comprising adjusting a ratio of fuel between the two fuel injections during the compression stroke of the cylinder in response to intake valve closing timing.

3. The method of claim 1, further comprising selecting a next cylinder in an order of combustion of the engine in response to the cylinder being within a first threshold number of crankshaft degrees before the cylinder's TDC compression stroke, the first threshold number of crankshaft degrees less than the second threshold number of crankshaft degrees.

4. The method of claim 1, further comprising providing spark to the cylinder only after fuel is injected to the cylinder since the engine stop.

5. The method of claim 4, further comprising automatically restarting the engine.

6. The method of claim 1, where the second threshold number of crankshaft degrees is less than the third threshold number of crankshaft degrees.

* * * * *